Dec. 3, 1968   A. W. MERK   3,413,788
FRUIT HARVESTING MACHINE
Filed Oct. 22, 1965   3 Sheets-Sheet 2
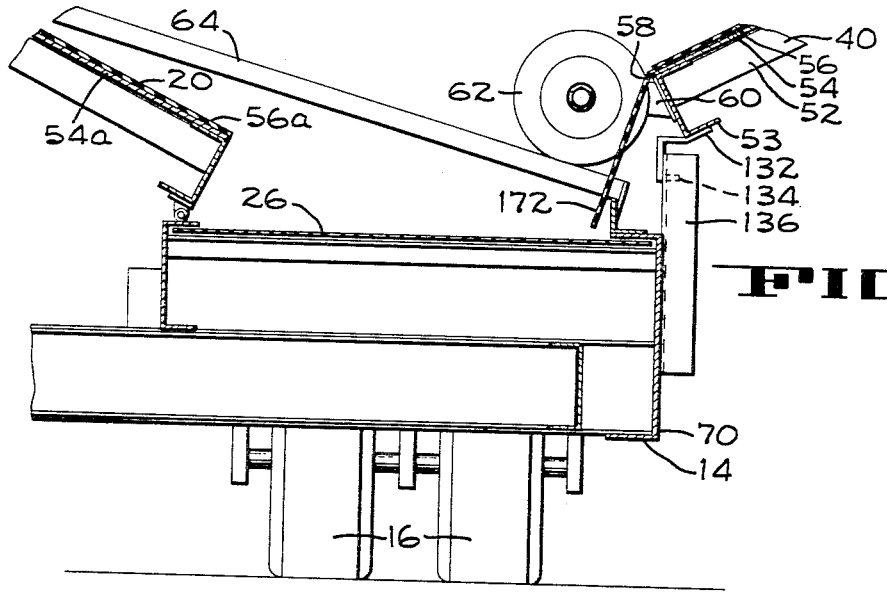
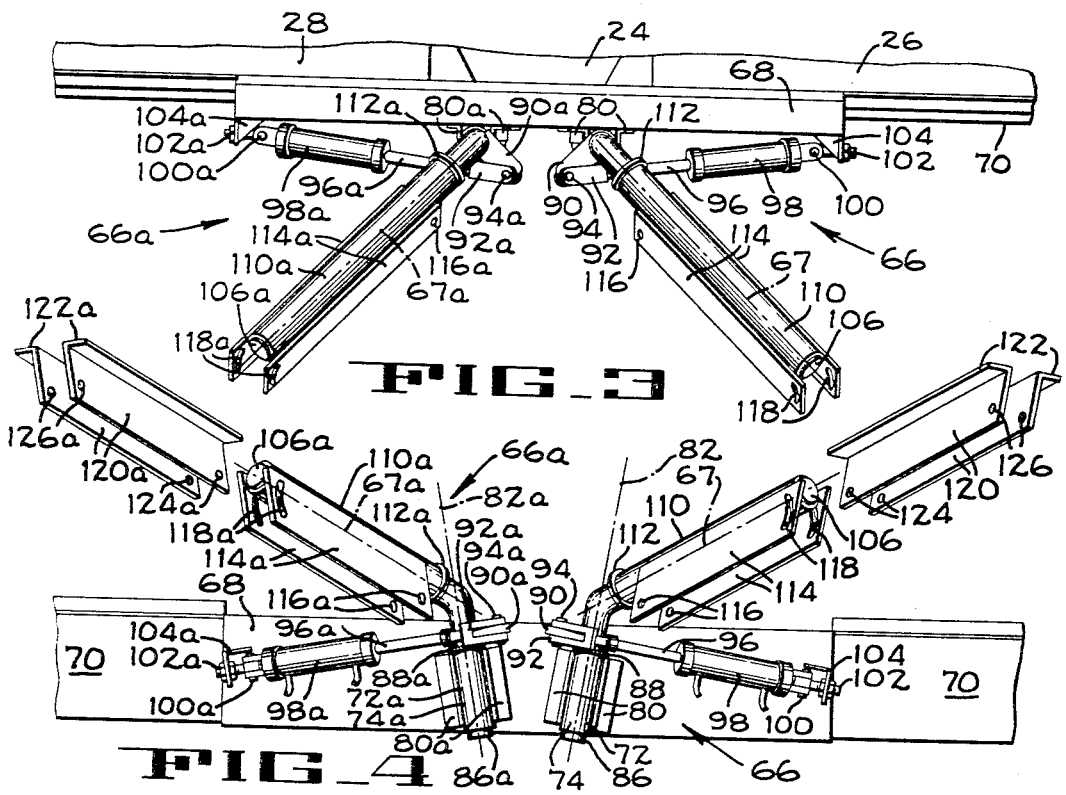
INVENTOR
ANDREW W. MERK
BY Hans G. Hoffmeister
ATTORNEY Dec. 3, 1968  A. W. MERK  3,413,788
FRUIT HARVESTING MACHINE
Filed Oct. 22, 1965  3 Sheets-Sheet 3
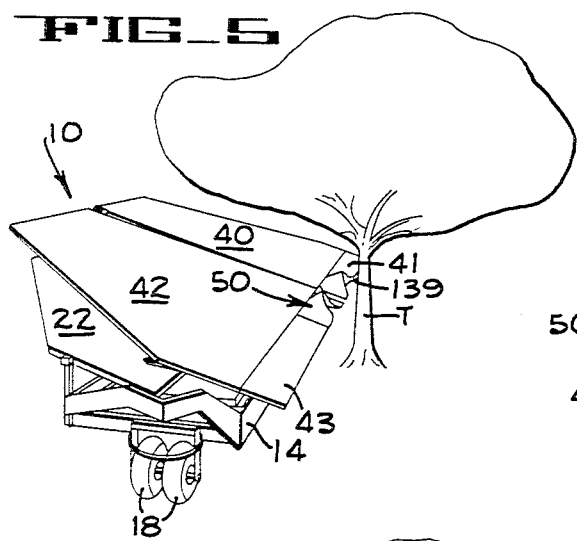
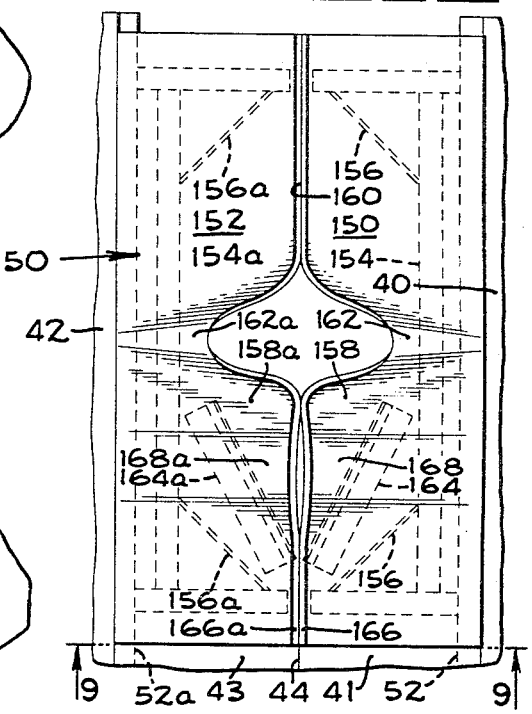
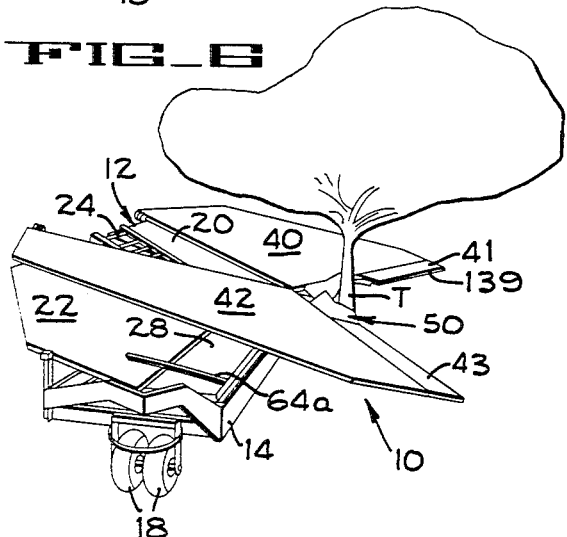
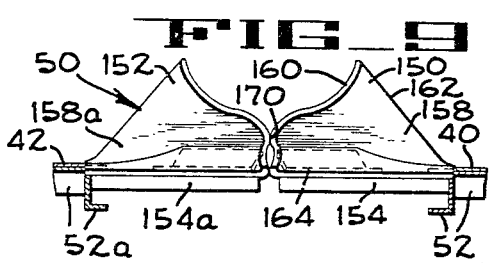
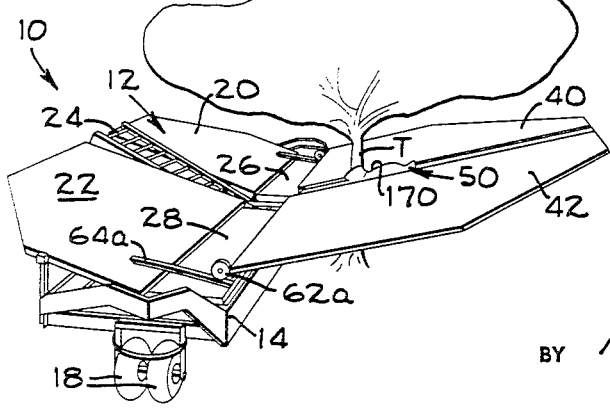
INVENTOR
ANDREW W. MERK
BY Hans G. Hoffmeister
ATTORNEY United States Patent Office 3,413,788
Patented Dec. 3, 1968

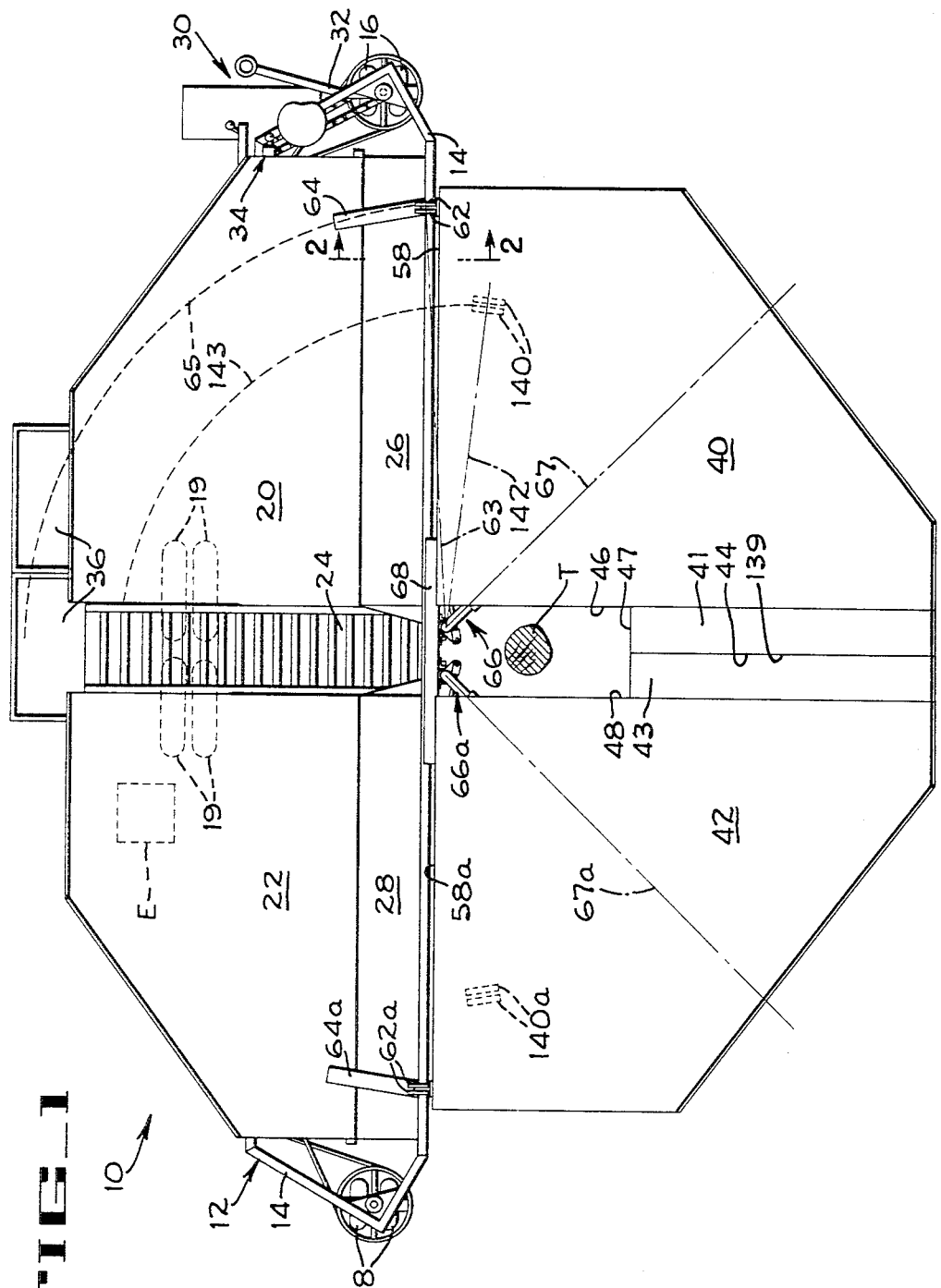

3,413,788
FRUIT HARVESTING MACHINE
Andrew W. Merk, Roseville, Calif., assignor to FMC Corporation, San Jose, Calif., a corporation of Delaware
Filed Oct. 22, 1965, Ser. No. 500,767
11 Claims. (Cl. 56—329)

ABSTRACT OF THE DISCLOSURE

This invention is drawn to a fruit collector which utilizes cooperating collection panels which direct fruit into a conveyor.

---

The present invention pertains to the harvesting of orchard fruit, and more particularly relates to a self-powered harvesting machine having movable fruit collection panels arranged to envelop the trunk of the tree, gather the fruit, and pack the fruit into bins which are then deposited throughout the orchard for subsequent removal to the packing shed.

More specifically, the harvesting machine of the present invention concerns a further development of the fruit harvesting machine disclosed in the pending patent application of John W. Edgemond, Jr., Ser. No. 198,231, for Fruit Harvesting Machine, which application is assigned to the same assignee as the present invention.

In the above-identified patent application, two self-powered and independently steered machine sections are provided. These two sections are maneuvered into positions straddling the trunk of the tree, and a closure shield on one of the machine sections is projected to bridge the gap between the two sections. A tree shaker boom on each section is then secured to the tree limbs and vibrated to shake the fruit free. Fixed fruit collection panels which are associated with each machine section direct the falling fruit onto conveyors that deliver the fruit into collection bins. Because the Edgemond harvesting machine is essentially two cooperating but separate machines, its cost is sometimes more than is justified for small orchards or infrequent use.

The fruit harvesting machine of the present invention includes one of the above mentioned machine sections (the section without the projectable closure shield) and uniquely constructed and arranged movable fruit collection panels which, after the machine is in a harvesting position, are projected under low lying branches into positions enveloping the trunk of the tree and declining toward the machine to direct the harvested fruit onto the fruit conveyors. In the present instance, the fruit is shaken from the tree by means carried by a separate vehicle, such as a tractor-mounted shaker which engages the trunk of the tree near the ground, or a limb-type of shaker mounted on an attendant tractor or truck.

One of the objects of the present invention is to provide an improved fruit harvesting machine for gathering and packing orchard fruit.

Another object of the invention is to provide a relatively inexpensive and efficient self-powered fruit harvesting machine.

Another object is to provide a novel hinge assembly for the catch frame panel of a fruit harvesting machine whereby the panel is steeply inclined at each limit of movement and sweeps low to the ground intermediate its limits of movement.

Another object is to provide a fruit harvesting machine having fruit collection panels arranged to be positioned in enveloping relation to the trunk of a tree and movable from the harvesting machine into such positions under the low lying branches and clear of adjacent trees.

Other objects and advantages of the present invention will become apparent from the following description and the accompanying drawings, wherein:

FIGURE 1 is a schematic plan showing the harvesting machine of the present invention in a tree harvesting position.

FIGURE 2 is an enlarged transverse, fragmentary section taken along lines 2—2 on FIGURE 1, and particularly illustrates a latch for securing one of the fruit collection panels in projected position, and support wheels which function during projection of the panel.

FIGURE 3 is an enlarged plan of the panel mounting and moving means shown at the center of FIGURE 1, with the panels removed.

FIGURE 4 is an elevation of the mechanism shown in FIGURE 3.

FIGURES 5–7 are successive operational perspectives illustrating the manner in which the movable fruit collection panels are projected outward beneath the lowest tree limbs and pivot upward into fruit catching position.

FIGURE 8 is an enlarged fragmentary plan of the closure flaps which seal around the trunk of the tree.

FIGURE 9 is a section taken along lines 9—9 on FIGURE 8.

Briefly, that portion of the fruit harvesting machine 10 (FIG. 1) which is shown and described in the above-identified patent application includes a self-powered machine section 12 having an elongate frame 14, steerable front and rear pairs 16 and 18 of support wheels, intermediately positioned pairs of tandem driving wheels 19, and an engine E. The engine is coupled to the driving wheels by a hydraulically energized power train, not shown. Mounted upon, and in transversely inclined relation to the frame 14, is a substantially planar fruit collection panel assembly comprising a fixed forward panel 20 and a fixed rear panel 22, between which is mounted an elevating conveyor 24. Coextensive with the bottom edges of the fruit collection panels 20 and 22 are fruit delivery conveyors 26 and 28, respectively, that have upper conveying flights movable toward the bottom, inlet end of the elevating conveyor 24. The machine section 12 also includes a driver's station 30 at the front of the machine, a steering tiller 32, and various hydraulic control valves indicated generally at 34. The section 12 of the machine is described in the above-mentioned Edgemond application, and reference may be had to said application for a description of any mechanism or operation not mentioned hereinafter.

In conjunction with other fruit collection panels presently described, the fallen fruit (in the present instance detached from the tree by auxiliary apparatus, not shown, or by manual shaking operations) are guided by the collection panels 20 and 22 onto the fruit delivery conveyors 26 and 28 toward which the panels slope, and are thus delivered to the elevating conveyor 24. One of two fruit collection bins 36 is carried below the discharge end of the elevator conveyor for receiving the harvested fruit.

The subsequent description concerns movable fruit collection panels or catch frames which coact with the collection panels 20 and 22 so that the machine 12, except for the necessary shaker boom apparatus mentioned previously, comprises a mobile fruit harvesting machine which is arranged to collect and pack the fruit shaken from the trees. It will be understood, however, that the shaker boom or booms are omitted in the interests of a relatively low cost harvesting machine, but can be mounted upon the machine 12 and powered therefrom substantially as shown and described in the above-identified pending patent application.

Cooperating with the fixed fruit collection panels 20 and 22 are associated movable fruit collection panels 40 and 42, respectively, which in their projected fruit-receiving positions shown in FIGURE 1 form a coplanar assembly that is complementary to the assembly comprising panels 20 and 22, and which surrounds the trunk T of the tree being harvested. When they are in operating position, the fruit collection panels 40 and 42 decline toward the fruit delivery conveyors 26 and 28, as seen in FIGURE 7, and carry lightweight extension panels 41 and 43 (FIG. 1) which have confronting and abutting edges at 44. The panels 41 and 43 define the outer edge 47 of an aperture which includes panel edge portions 46 and 48, and which provides clearance for the tree trunk T. The intervening space between the edges of the aperture and the tree trunk is sealed by a separable closure structure 50 (FIG. 8) which will be described presently.

Construction of the two movable fruit collection panels 40 and 42 is identical, but reversed; the following description is directed primarily to structure associated with panel 40, and the same reference numerals, with the suffix "a," are used for the corresponding structure for panel 42.

The support structure for the fruit collection panel 40 (FIG. 2) includes a plurality of interconnected, lightweight channel members 52, and a relatively heavy channel member 53 which extends along the edge of the frame 14. All the channel members are covered by panels 54 of thin plywood or similar material, and are faced with a resilient pad 56 in order to minimize damage to fruit dropping thereon. The panel 40, near the outer end of its inner longitudinal edge 58, is provided with a support bracket 60 which carries a pair of freely rotatable support wheels 62 (FIG. 1). The wheels 62 have an axis of rotation 63 which intersects the pivot axis of a power-actuated pivot or hinge assembly 66 that mounts the panel 40 for edgewise swinging movement and for rocking movement about an axis 67 while being swung—all as will be presently described.

In the fruit gathering position of the panel 40, (FIGS. 1 and 2), the wheels 62 are supported by an inclined, fixed rail 64 that bridges the fruit delivery conveyor 26. The lower end of the rail 64 is secured to the machine frame 14, and its upper end is secured to the fruit collection panel 20. When the panel 40 is retracted from its FIGURE 1 harvesting position after a fruit harvesting operation, the support wheels 62 roll upon the upper surface of the fruit collection panel 20 along the dotted line path 65 until they move beyond the upper edge of the panel 40 and thus no longer support the panel. However, before the wheels 62 roll off the panel 20, support of the panel 40 is assumed by a pair of auxiliary wheels 140 which are mounted on the underside of the panel 40 and are arranged to roll upon the fruit collection panel 20. During movement to the retracted position, the panel 40 rocks about axis 67 which is provided by a lateral extension of the pivot assembly 66.

The axis of rotation 142 of the wheels 140 intersects the axis of rotation 63 of the wheels 62 at the pivot assembly 66, and when the wheels 140 contact the fixed fruit collection panel 20 upon retracting movement of the movable fruit collection panel 40, they follow the dotted line path 143. Since the panel 40 can be rocked about the axis 67, and is heaviest along the edge 58, the wheels 62 or 140 remain in contact with the panel 20 when panel 40 is retracted.

The pivot assembly 66 is mounted upon a large angle bar 68 (FIGS. 3 and 4) which is in turn secured to an adjacent channel 70 that defines one marginal edge of the machine frame 14. The pivot assembly 66a is mounted in similar manner on the same angle bar 68.

The pivot assembly 66 includes a bearing 72 that is provided with tubular body 74 having side angle brackets 80 which are secured to the angle bar 68. The axis 82 of the tubular body 74 lies in a vertical plane parallel to the angle bar 68 and is inclined about 10 degrees toward the front of the frame which is the right hand end in FIGURE 1. The axis 82a of the corresponding bearing 72a lies in the same vertical plane and inclines about 10 degrees toward the rear of the frame 14. The axes 63 and 142 (FIG. 1) of the wheels 62 and 140 both intersect the axis 82.

Rotatably mounted in the bearing 72 is the lower end portion of a pivot leg 86 (FIG. 4) having a fixed collar 88 that bears on the upper end of the tubular body 74. Immediately above the collar 88, a lever arm 90 (FIG. 3) is welded to the pivot leg 86, and a bifurcated bracket 92 is pivoted by a pin 94 to the lever arm 90. Bracket 92 is secured to the end of the piston rod 96 of a double-acting hydraulic ram 98 that is in parallel fluid connection with its counterpart ram 98a for the panel 42. The cylinder of the ram 98 is pivotally connected by a pin 100 to an eyebolt 102, and locknuts hold the eyebolt in adjusted axial position relative to a support bracket 104 that is welded to the angle bar 68.

Means for mounting the fruit collection panel 40 on the pivot leg 86 include an elongate tubular sleeve 110 that is rotatably mounted on the outer portion of a cylindrical pivot arm 106 which projects laterally from the pivot leg 85 and defines the rocking axis 67. Sleeve 110 is supported by virtue of its end engagement with a collar 112 that is secured to the pivot arm. Depending from each side of sleeve 110 is a plate 114 having an aperture 116 and a slot 118. A pair of spaced panel support plates 120 are provided with upper flanges 122 which are welded to the underside of the fruit collection panel 40, not shown, and each plate is provided with apertures 124 and 126 that respectively align with the apertures 116 and slots 118 of the plates 114. Bolts, not shown, lock the panel support plates 120 to the sleeve 110 so that minor manufacturing tolerances can be compensated for in positioning the panel parallel to the pivot arm 106.

One of the hydraulic control valves at 34 near the driver's station 30 governs the simultaneous actuation of both rams 98 and 98a, whereby the pivot legs 86 and 86a are simultaneously rotated. Such rotation carries the respective upper end arm portions 106 and 106a of the pivot legs from their FIGURES 1 and 7 positions about 90 degrees inward toward the machine 12 whereby the panels 40 and 42 are retracted, as shown in FIGURE 5, and the machine may then be moved from tree to tree between harvesting operations, or between adjacent orchards. The specific construction and arrangement of the panel mounting and support means assures that the panels can move between retracted and projected positions without damaging the tree.

In order to assure that a sudden concentration of fruit upon the fruit collection panel 40 (FIG. 1) at the tree side of the axis 67 does not unbalance the panel and raise its wheel-supported corner, the channel 53 (FIG. 2) is provided with a latch bar 132 which has a tongue 134 that projects through a slot, not shown, in a fixed channel member 136. Contact of the latch bar 132 with the channel member 136 is maintained by the fact that, when the piston rod 96 is moved to its extended position, it is held in that position during the fruit-gathering operation.

The included angle between the axis 67 (FIG. 4) and the pivot axis 82 is 110 degrees. The upper arm 106 of the pivot leg 86 is swung by the ram 98 about 90 degrees between its retracted and projected positions. Further, the fruit collection panel 20 (FIG. 2) inclines about 30 degrees from the horizontal, and the fruit collection panel 40, when projected, also inclines at about 30 degrees. As a result of these specific angular measurements in the embodiment of the invention chosen for illustration, and as a result of the specific connection of the pivot arm 106 to the panel 40 and the wheel support of the panel, when the panel is retracted it lies substantially parallel to the panel 20 of the machine section 12, and when fully projected assumes substantially the same angular tilt from horizontal as the panel 20. It is thus a particularly important feature of the pivot assembly 66 that the panel 40 is mounted to simultaneously swing about the axis 82 and rock about the axis 67 so that its free marginal edge portions move in a concave or depressed arcuate path between the limits of movement of the panel. Accordingly, the panel 40 in being moved from its fully retracted FIGURE 5 position, through its FIGURE 6 intermediate position, and to its fully projected FIGURE 7 position, initially swings close to the ground so as to clear low-lying branches of the trees being harvested.

In further explanation of the above noted operational movements, it will be evident that the panel 40 when being projected outward cannot maintain parallelism with the panel 20 and yet clear the ground with its leading edge. Due to the capability of the panel 40 to rock about the axis 67 however, the leading edge portion 139 (FIG. 5) of the panel 40 rises while the wheels 140 (FIG. 1) roll down the panel 20. The net result of the interrelated actions of the pivot assembly 66 and the support wheels 62 and 140 is that the panel edge portion 139 travels very close to the ground so as to clear even the lowest branches of the tree, and then rapidly rises as the wheels 140 approach the bridge rail 64; at their outer limits of travel the panels 40 and 42 incline upward substantially the same amount as the panels 20 and 22, and the flexible closure 50 is in sealed relation with the tree trunk T.

The closure 50 (FIGS. 8 and 9) includes two cooperating closure units 150 and 152 which are respectively carried by the collection panels 40 and 42. As in the case of the panels 40 and 42, the closure units 150 and 152 are similar, but reversed, and only the closure unit 150 is described herein. Support structure for the closure unit 150 comprises an angle bar frame 154 which is secured to one of the channel members 52 shown in FIGURE 9, and the open end of which faces the corresponding frame 154a. Diagonal braces 156 reinforce the corner portions of the frame 154.

Secured to the upper surface of the frame 154 is a flap 158 of resiliently flexible material such as fabric-reinforced rubber belting. The pattern of the flap 158 is such that, when unmounted, it is larger than the frame 154 along its inner edge 160; when mounted, the flap is buckled upward at 162 intermediate the ends of the edge 160. The upwardly buckled area 162, because its edge portions are directed substantially upward, easily flexes so that it conforms to the corresponding area of the average tree trunk when its operative position is attained. Some tree trunks, however, are of irregular shape in cross-section and vary considerably in circumference. It thus sometimes happens that some part of the edge 160 does not contact the trunk, and an unsealed aperture results which could divert fruit onto the ground. To preclude such loss of fruit, the flap 158 is provided a V-shaped angle bar 164 that is secured to the underside of the flap near the extension panel 41 (FIG. 1), i.e., on the highest end portion of the flap when the fruit collection panel 40 is in its fruit catching position. As a consequence, the inner, upper edge at 166 (FIG. 8) of the flap 158 is turned upward, and in cooperation with the adjacent similarly upturned edge 166a of the flap 158a, forms a wall 170 (FIG. 9) which has opposite side portions at 168 and 168a that blend into the buckled areas 162 and 162a. Accordingly, even if the edges of the buckled areas are imperfectly sealed around the tree trunk, the wall 170 (see also FIGURE 7) causes the fruit to be diverted laterally away from the trunk and from any apertures which may exist between the trunk and the closure flaps 158 and 158a.

When the fruit is being harvested, an elongate rubber flap 172 (FIG. 2) which depends from the inner longitudinal edge 58 of the panel 40 guides the harvested fruit onto the fruit delivery conveyor 26. Similarly, the fruit delivery conveyor 28 (FIG. 1) receives the fruit intercepted by the panel 42, and both conveyors 26 and 28 deliver the fruit to the elevator conveyor 24 from which the fruit is discharged into the fruit collection bin 36 lying beneath the discharge end of the elevator. In the manner fully described in the above-identified Edgemond patent application, the bin, when full, is deposited upon the ground for subsequent pickup by a fork lift truck, and an empty bin is positioned under the discharge end of the elevator 24.

After the harvesting operation for one tree is completed, the operator actuates the control valve for simultaneously retracting the piston rods of the hydraulic rams 98 and 98a, whereby the pivot arm 106 swings counterclockwise (FIG. 1) and arm 106a swings clockwise through respective arcs of 90 degrees. At about midpoint of their travel, the arms 106 and 106a are longitudinally aligned with the frame channel 70 and incline upward 10 degrees from horizontal. The wheels 140 and 140a of the panels 40 and 42 are, however, near the upper edges of the fixed panels 20 and 22, whereby each movable panel 40 and 42 is thus in a position rotated or rocked from its former position about its pivot arm 106 and 106a, with the result that even though the central parts of the panels incline upward 10 degrees along the axes 67 and 67a, the trailing edges of the retracting panels are low to the ground and clear of the lower tree limbs somewhat as shown in FIGURE 6.

Rocking movement of the movable panels 40 and 42 about their respective pivot arms 106 and 106a is initiated at the very beginning of the retracting strokes of the rams 98 and 98a because the bridge rails 64 and 64a incline upward toward the machine 12.

Retracting movement of the panels 40 and 42 is thus immediately accompanied by a lowering movement of their trailing edges, while projecting movement of the panels causes the leading edges of the panels to dip down while they move forward. In either case, retracting or projecting movement of the panels 40 and 42, as effected by the novel structure including the pivot assemblies 66 and 66a, assures that the limbs of the tree do not interfere with the movement of the panels, and that the panels cannot injure the tree during such movement.

While a particular embodiment of the invention has been shown and described, it will be apparent that the structural details and specific angular measurements given for the illustrated preferred embodiment of the invention are capable of modification and alteration and that the scope of the invention should be limited only by proper interpretation of the claims appended hereto.

Having thus described the invention, that which is believed to be new, and for which protection by Letters Patent is desired, is:

1. A fruit harvesting machine comprising an elongate wheel-supported frame, a fixed fruit collection panel mounted on said frame, said fixed panel being substantially coextensive with said frame and transversely inclined toward one longitudinal edge thereof, and a pair of projectable fruit collection panels carried by said frame, each of said latter panels having relatively thin marginal edges and being provided with a pivotal mounting on said frame adjacent to the center of the lower edge of said fixed panel, said projectable panels being respectively movable in a substantially horizontal curved path between positions overlying the said fixed panel and positions which are outwardly and upwardly inclined opposing said fixed panel and are in edgewise abutting relation with each other.

2. A pivot assembly for connecting a movable fruit collection panel to the frame of a fruit harvesting machine comprising a pivot leg carried by said frame, said pivot leg being arranged to rotate about a non-vertical axis and having a lateral arm at an obtuse angle relative to said leg, and means for rotating said leg about said axis between a position wherein said lateral arm overlies said frame and a position wherein said lateral arm projects away from said frame member such that at each limit of movement of said leg said arm inclines upward from the horizontal and lies in a vertical plane diagonally related to the major dimension of the harvesting machine frame.

3. In a fruit harvesting machine the combination comprising a wheel-supported frame, a pair of fruit collection panels carried by said frame, said panels cooperatively defining a coplanar fruit collection surface projecting from said frame and being separable along a vertical plane including the trunk of an orchard tree, individual pivot means mounting the confronting inner corner portions of said panels to said frame for retracting movement of said panels to positions overlying said frame, each panel being arranged for rocking movement about its associated pivot means, support means depending from each of said panels in positions adjacent the distal ends of their respective leading edges relative to their retracting movement, and fixed support surfaces mounted on said frame in positions engaging and elevating said support means so that each of said panels is rocked to lower its trailing edge when the two panels are separated and retracted.

4. A fruit harvesting machine comprising a wheel-supported frame, a first planar fruit collection panel transversely inclined in relation to the elongate dimension of the frame, a pivot assembly connected to said frame adjacent the lower edge of said panel, said pivot assembly including an upright pivot leg rotatably mounted on said frame and a lateral pivot arm carried by said leg, a second planar fruit collection panel having one corner portion superposed above said arm, said arm lying in a vertical plane diagonally related to the planar surface of said second panel, means connecting said second panel to said arm for rotation of the panel about the longitudinal axis of the arm, a support wheel depending from said second panel, and means for rotating said leg to a position wherein said second panel overlies said first panel, said support wheel thus rolling over the surface of said first panel and causing said second panel to rock about said pivot arm axis whereby the leading edge of the retracting panel rises and the trailing edge drops.

5. A fruit harvesting machine comprising a wheel-supported frame, a first planar fruit collection panel transversely inclined in relation to the elongate dimension of the frame, a pivot connected to said frame adjacent the lower edge of said panel, said pivot including an upright pivot leg rotatably mounted on said frame and a lateral pivot arm carried by said leg, a second planar fruit collection panel having one corner portion superposed above said arm, said arm lying in a vertical plane substantially aligned with a diagonal dimension of said second panel, means rotatably connecting said second panel to said arm for limited rocking movement of the panel about the longitudinal axis of the arm, means overbalancing said second panel about said axis toward said frame, a support wheel depending from the heavier side of said second panel, and means for rotating said pivot leg to a position wherein said second panel overlies said first panel, said support wheels thus rolling over the surface of said first panel and causing said second panel to diagonally rock about said longitudinal axis of said arm.

6. A fruit harvester comprising a mobile frame having an elongate inner edge adapted to be positioned adjacent an orchard tree with the fore and aft center point of the frame being substantially coincident with a transverse vertical plane including the tree trunk; a pair of pivot assemblies mounted on said inner frame edge adjacent said center point; each of said pivot assemblies including a lateral pivot arm projecting outward from the frame, an upright pivot leg secured to said arm and rotatably connected to said frame, and power means for rotating the leg to a position wherein the arms overlie the frame; a fixed fruit collection panel mounted on said frame and declining toward the inner edge of the frame; a movable fruit collection panel carried by each of said arms, the two movable panels abutting along a line coincident with said transverse vertical plane and inclining upwardly away from said inner edge of the frame, the abutting edges of said movable panels having recessed portions cooperatively defining panel edges spaced from the trunk of the tree; and a resilient closure flap mounted on the panel edge portions of each of said movable panels for sealing around the trunk of the tree, each of said pivot assemblies being arranged when said power means is energized to simultaneously lower the trailing edge of its associated fruit collection panel while carrying the panel toward said fixed fruit collection panel and to separate the movable panels along their former abutment line.

7. A fruit harvesting machine comprising an elongate mobile frame, a fixed fruit collection panel mounted on said frame and declining toward one longitudinal edge of said frame, a pivot assembly secured to said frame edge and including an upright rotatable pivot leg and a pivot arm projecting laterally from said leg, power means connected to said leg for swinging said arm between retracted and projected positions diagonally related to said frame edge and respectively overlying said edge and projecting away from said edge, a substantially rectangular fruit collection panel having a corner portion rotatably secured to said lateral arm for rocking movement of the panel, said movable panel in the projected position of said arm having a lower edge portion substantially parallel to said frame edge and inclining upward from the frame, and a support wheel depending from the distal portion of said lower edge of the movable panel, said wheel being rotatable about an axis radially related to the turning axis of said pivot leg and engageable with said fixed panel when said arm is moved toward a retracted position.

8. In a fruit harvesting machine, an elongate frame, a pivot assembly including an upright pivot leg and a laterally projecting pivot arm carried by said leg, said leg being mounted for rotation on said frame, said leg lying in a vertical plane parallel to the major dimension of said frame and capable of being rotated to swing said lateral arm substantially 45 degrees at each side of said vertical plane, the angular relation of the longitudinal axes of said arm and said leg and the angular disposition of said pivot axis in said vertical plane being such that the axis of said arm at each limit of its swinging movement lies in a plane inclined upwardly from the intersection of said arm and leg axes so that the arm moves in a concave path between said limits of movement.

9. Mounting means for a fruit collection panel carried by and capable of being projected from the frame of a fruit harvesting machine comprising a pivot assembly including an upright pivot leg and an associated lateral pivot arm disposed at more than 90 degrees relative to said leg, bearing means carried by said frame and mounting said leg for rotation about a non-vertical axis, and means for effecting rotation of said leg to carry said arm toward each side of a vertical plane parallel to the major dimension of the frame and intersecting said upright axis.

10. An apparatus for catching fruit shaken from a tree comprising, a wheel supported elongated frame movable alongside the tree, a fixed panel on said frame and inclined downwardly toward the tree, a pair of movable panels initially overlying said fixed panel, primary pivot means supporting said movable panels on said frame at the lower mid-edge of said fixed panel for a complementary swinging motion of said movable panels out and around the tree, secondary pivot means for accommodating a rocking motion of the movable panels so that they incline downwardly toward the fixed panel when closed around the tree.

11. The apparatus of claim 10 wherein said secondary pivot means is between said movable panels and the primary pivot means.

References Cited

UNITED STATES PATENTS

| | | | |
|---|---|---|---|
| 478,903 | 7/1892 | Ball | 56—329 |
| 1,293,460 | 2/1919 | Johnson et al. | 56—329 |
| 1,520,129 | 12/1924 | Hedeen | 56—329 |
| 2,386,881 | 10/1945 | Phillips | 56—329 X |
| 3,105,346 | 10/1963 | Stanclift | 56—329 |
| 3,218,790 | 11/1965 | Edgemond | 56—329 |

ROBERT E. BAGWILL, *Primary Examiner.*